(12) United States Patent
Huang et al.

(10) Patent No.: US 8,375,567 B2
(45) Date of Patent: Feb. 19, 2013

(54) METHOD FOR AUTOMATICALLY DETERMINING THE DIRECTION INSTALLATION OF AN ELECTRONIC LOCK

(75) Inventors: Lien-Hsi Huang, Kaohsiung (TW); Shin-Han Lin, Kaohsiung County (TW)

(73) Assignee: Taiwan Fu Hsing Industrial Co., Ltd., Kang Shan Town, Kaohsiung County (TW)

(*) Notice: Subject to any disclaimer, the term of this patent is extended or adjusted under 35 U.S.C. 154(b) by 427 days.

(21) Appl. No.: 12/700,466

(22) Filed: Feb. 4, 2010

(65) Prior Publication Data

US 2011/0185554 A1    Aug. 4, 2011

(51) Int. Cl.
*H01H 11/00* (2006.01)
*H01H 65/00* (2006.01)

(52) U.S. Cl. .......................................... 29/622; 29/428

(58) Field of Classification Search ................ 29/622, 29/428, 433; 70/102, 107, 277, 278.2, 278.7, 70/283, 472, 473, 493
See application file for complete search history.

(56) References Cited

U.S. PATENT DOCUMENTS

| | | | | |
|---|---|---|---|---|
| 6,807,834 B2* | 10/2004 | Tsai | ............................... | 70/472 |
| 8,011,217 B2* | 9/2011 | Marschalek et al. | ............ | 70/473 |
| 2006/0112747 A1* | 6/2006 | Moon et al. | ..................... | 70/283 |
| 2008/0127686 A1* | 6/2008 | Hwang | ........................... | 70/107 |

* cited by examiner

*Primary Examiner* — Thiem Phan
(74) *Attorney, Agent, or Firm* — Muncy, Geissler, Olds & Lowe, PLLC

(57) ABSTRACT

A method for automatically determining the direction installation of an electronic lock is disclosed. The method achieves automatic determination of the electronic lock installed on the left-handed or right-handed door by controlling rotational directions of the rotational actuator and determining the touching sequence of switch units, so as to enable the electronic lock to be adapted to both the left-handed door and right-handed door, thereby significantly broadening the application scope and convenience of the electronic lock.

5 Claims, 12 Drawing Sheets

METHOD FOR AUTOMATICALLY DETERMINING THE DIRECTION INSTALLATION OF AN ELECTRONIC LOCK

FIELD OF THE INVENTION

The present invention relates to an electronic lock, and more particularly to a method for automatically determining the direction installation of an electronic lock.

BACKGROUND OF THE INVENTION

For fitting spacial planning of buildings, there are left-handed doors and right-handed doors. Conventionally, electronic locks are designed with latches matching the opening sides of door planks (left-handed or right-handed), and installed directionally&differently according to the different opening sides of the doors where they are being installed. Therefore, when a lock with unmatched latch arrangement is wrongly bought, or when the opening side of a door plank has to be switch due to the changed spacial planning, the existing electronic lock latch is not applicable, and additional purchase of another electronic lock latch has to be made. Thus, diseconomy and inconvenience ensue for changing the electronic lock.

SUMMARY

The primary objective of the present invention is to provide a method for automatically determining the direction installation of an electronic lock, wherein the electronic lock has a latch and a rotational actuator capable of driving the latch. The method comprises the steps of (a) driving the rotational actuator to rotate toward a first direction, and determining whether the rotational actuator is capable of being rotated, if yes, continuing to step (b), otherwise jumping to step (c); (b) enabling the rotational actuator to rotate toward the first direction, and meantime the rotational actuator touched a first switch unit and a second switch unit, then determining which of the switch units is prior touched by the rotational actuator, and if the rotational actuator touches the first switch unit prior to the second switch unit thereby confirming the electronic lock is installed on the left-handed door, otherwise, if the rotational actuator touches the second switch unit prior to the first switch unit thereby confirming the electronic lock is installed on the right-handed door; and (c) enabling the rotational actuator to rotate toward a second direction, and meantime the rotational actuator touched the first switch unit and the second switch unit, then determining which of the switch units is prior touched by the rotational actuator, and if the rotational actuator touches the first switch unit prior to the second switch unit thereby confirming the electronic lock is installed on the right-handed door, otherwise, if the rotational actuator touches the second switch unit prior to the first switch unit thereby confirming the electronic lock is installed on the left-handed door. The present invention achieves automatic determination of the electronic lock installed on the left-handed or right-handed door by controlling the rotational directions of the rotational actuator and determining the touching sequence of the switch units, so as to enable the electronic lock to be adapted to both the left-handed door and right-handed door, thereby significantly broadening the application scope and convenience of the electronic lock.

DETAILED DESCRIPTION OF THE INVENTION

Figure 1:
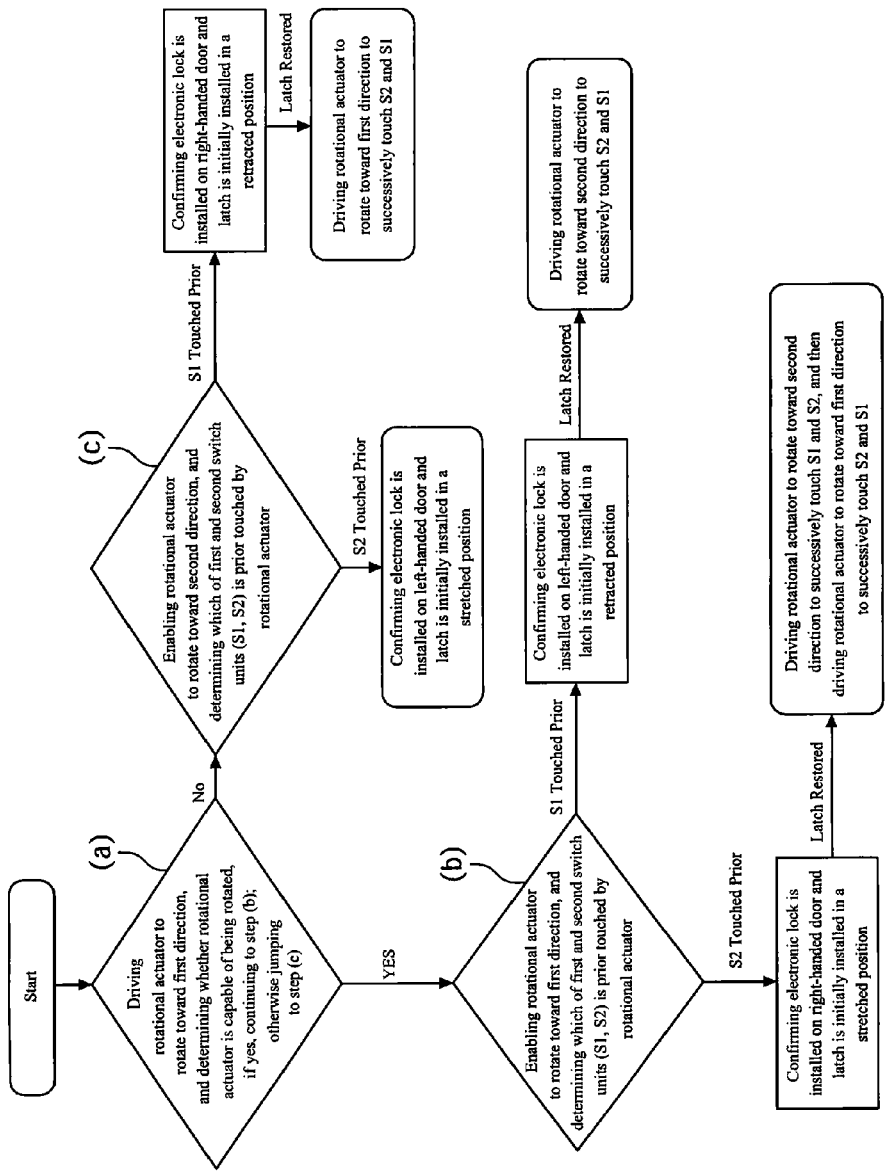
FIG. 1 is a flowchart of a method for automatically determining the direction installation of an electronic lock according to one preferred embodiment of the present invention.
Figure 2:
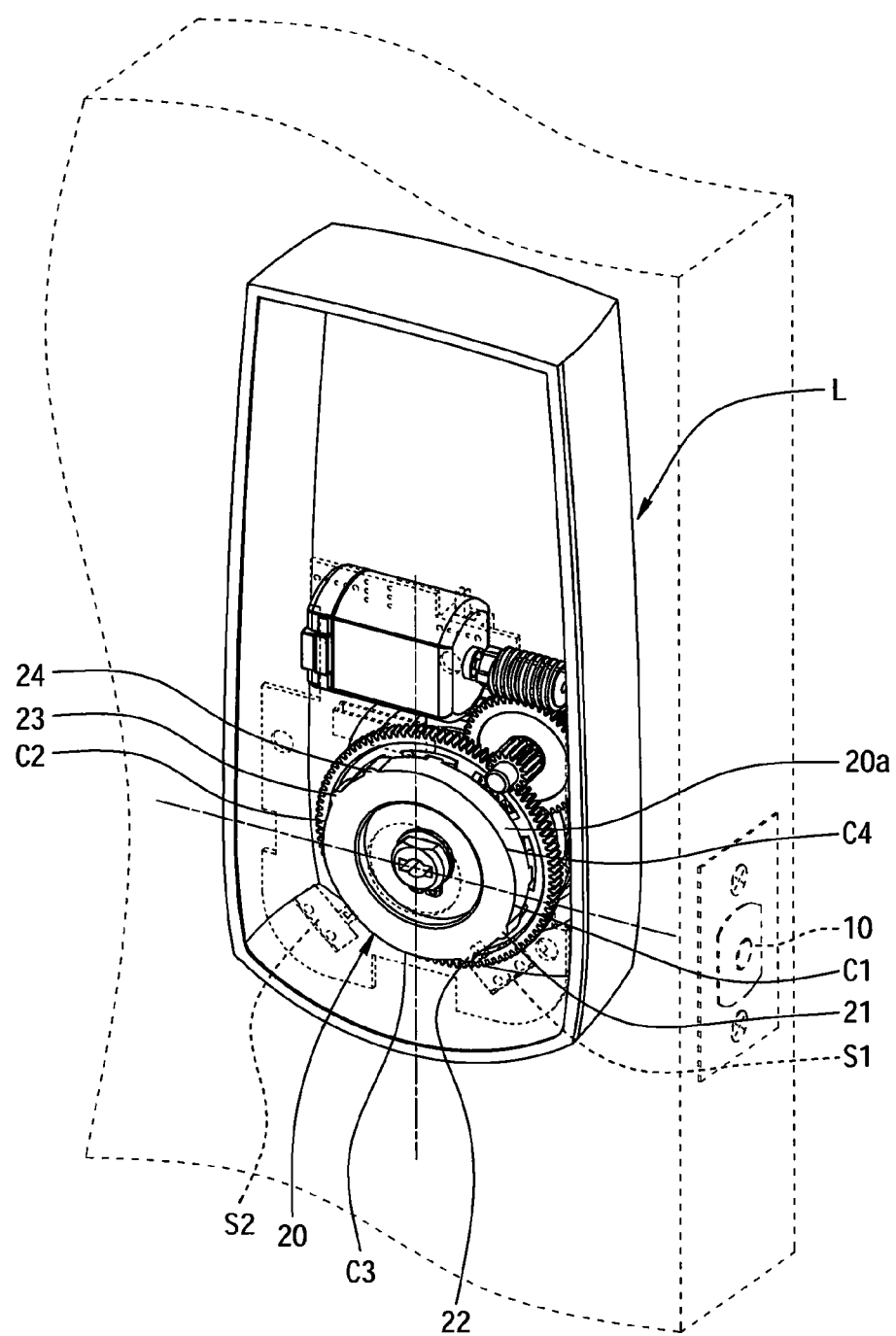
FIG. 2 is a schematic drawing of the electronic lock according to the preferred embodiment of the present invention.
Figure 3A:
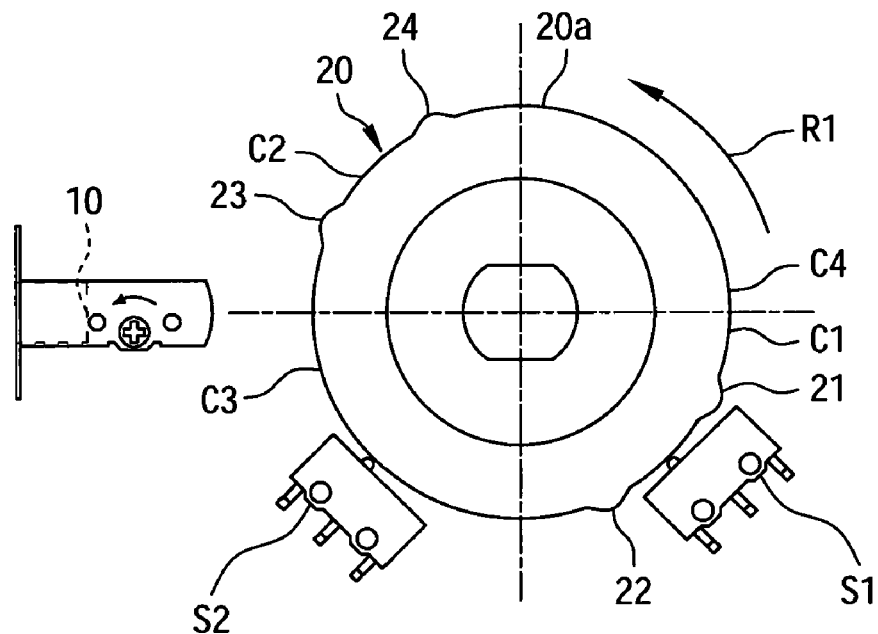
FIGS. 3A to 3D are schematic drawings showing how to confirm the electronic lock installed on the left-handed door in step (b).

Referring to FIG. 1, a method for automatically determining the direction installation of an electronic lock according to one preferred embodiment of the present invention is illustrated. The method is particularly performed as below. First, referring to FIGS. 1 and 2, the electronic lock L has a latch 10, a rotational actuator 20 capable of driving the latch 10, a first switch unit S1 and a second switch unit S2. Referring to FIGS. 3A and 3C, the rotational actuator 20 is defined with a first direction R1 and a second direction R2 opposite to the first direction R1, and the rotational actuator 20 is capable of being rotated toward a first direction R1 or a second direction R2 to touch the first switch unit S1 and the second switch unit S2. Referring to FIGS. 2, 3A and 3C, in the present embodiment, the rotational actuator 20 has a peripheral surface 20a, a first protrusion 21, a second protrusion 22, a third protrusion 23 and a fourth protrusion 24. The peripheral surface 20a is composed of a first curved surface C1, a second curved surface C2 opposite to the first curved surface C1, a third curved surface C3 located between the first curved surface C1 and the second curved surface C2 and a fourth curved surface C4 opposite to the third curved surface C3. Therein the first protrusion 21 and the second protrusion 22 are formed on the first curved surface C1; the third protrusion 23 and the fourth protrusion 24 are formed on the second curved surface C2. Referring to step (a) in FIG. 1 and FIGS. 3A, 4A, 5A, as well as 6A, in the step, the rotational actuator 20 is driven to rotate toward the first direction R1, and it is determined whether the rotational actuator 20 is capable of being rotated. If yes, the method is continued to step (b), otherwise jumped to step (c).

Figure 3B:
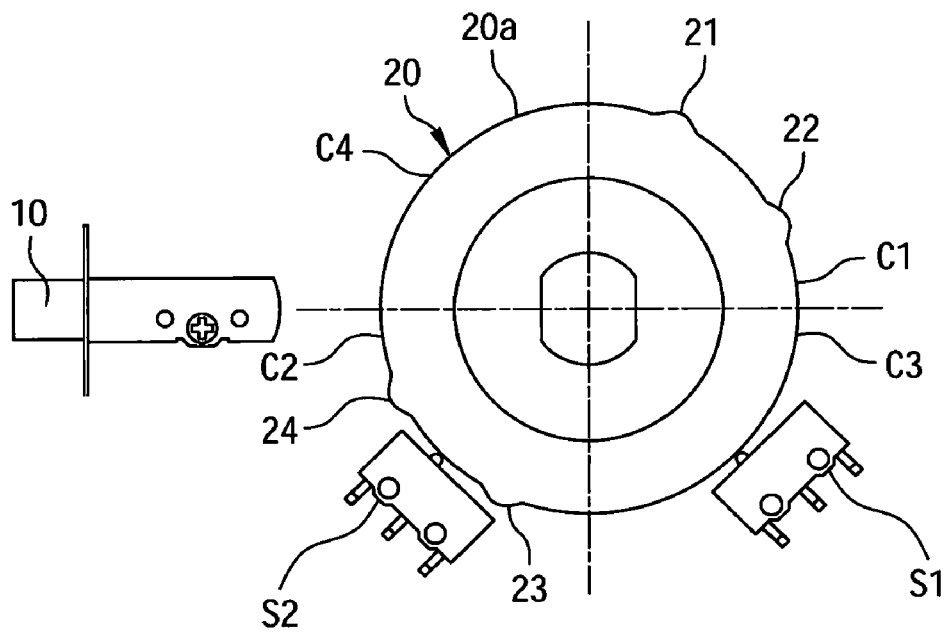
Figure 3C:
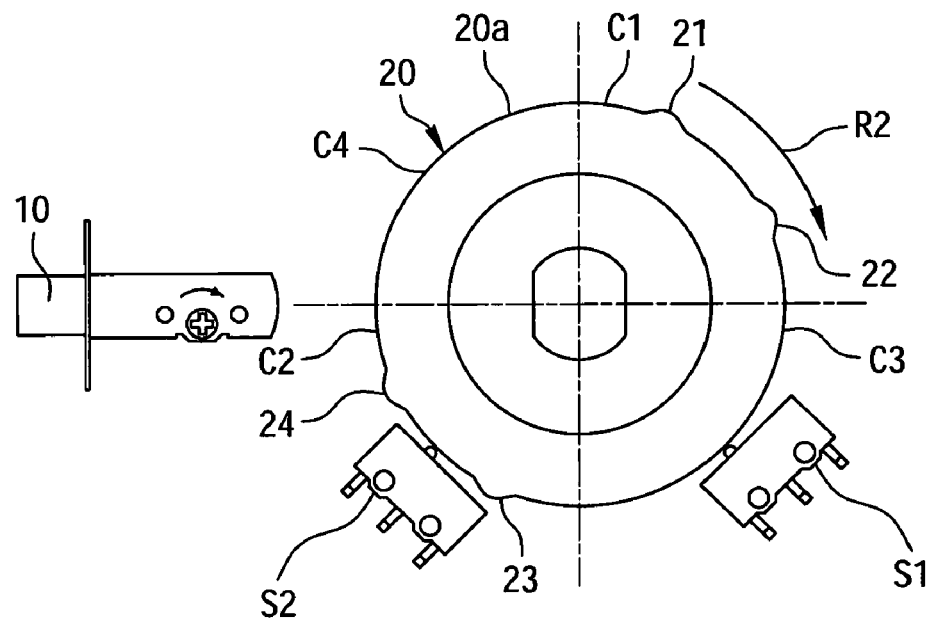
Figure 3D:
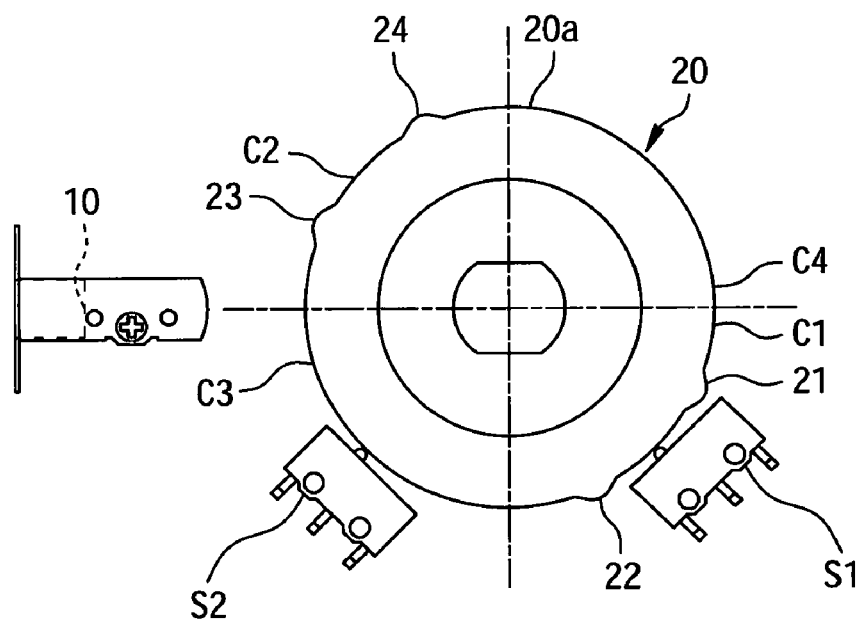
Figure 4A:
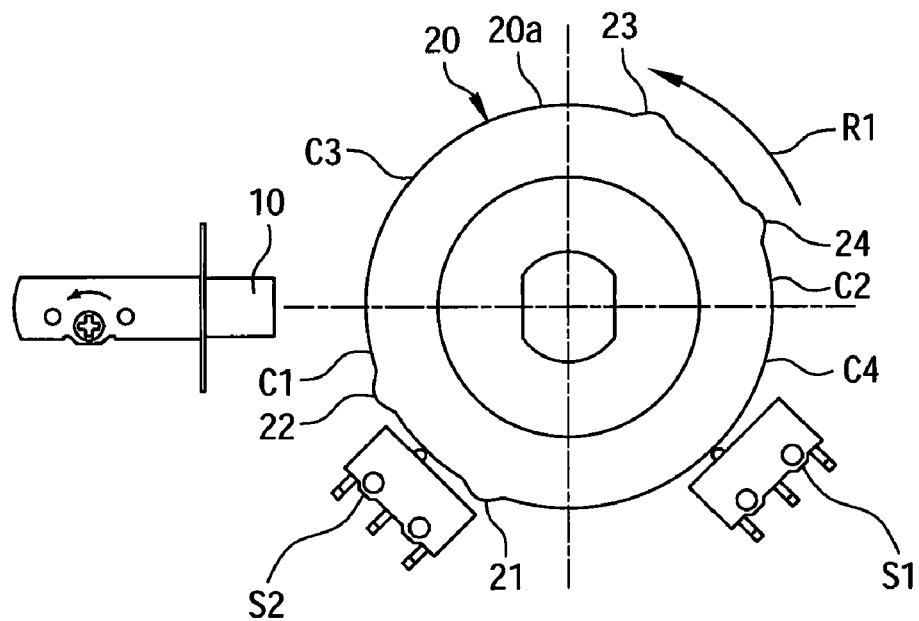
FIGS. 4A to 4F are schematic drawings showing how to confirm the electronic lock installed on the right-handed door in step (b).
Figure 4B:
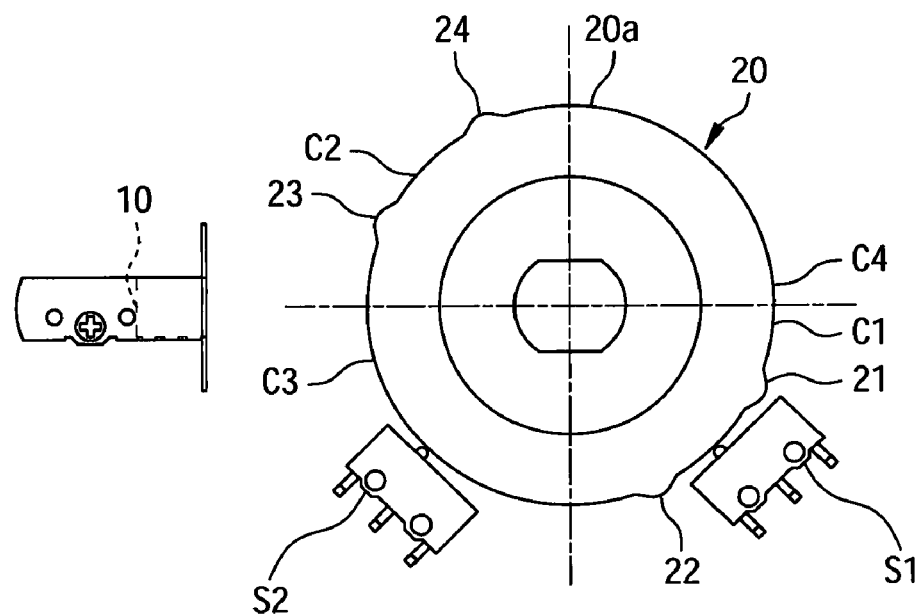
Figure 4C:
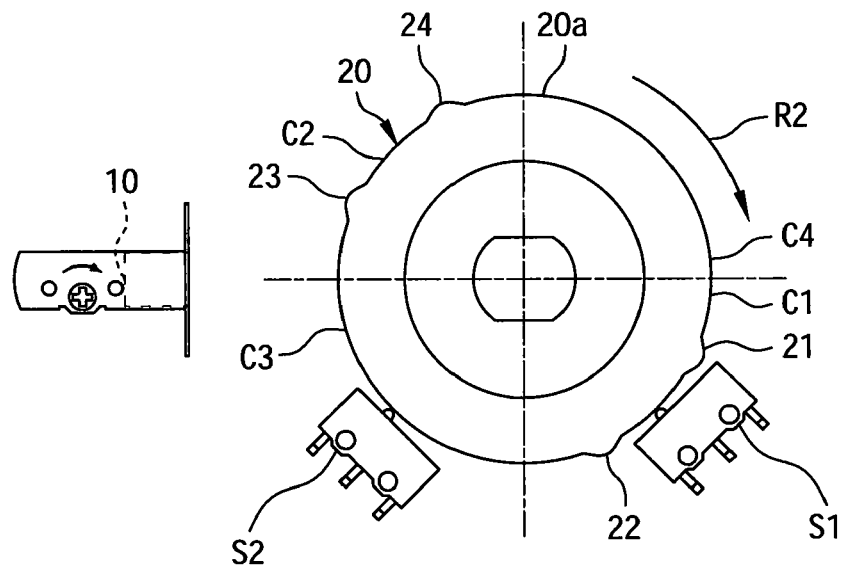
Figure 4D:
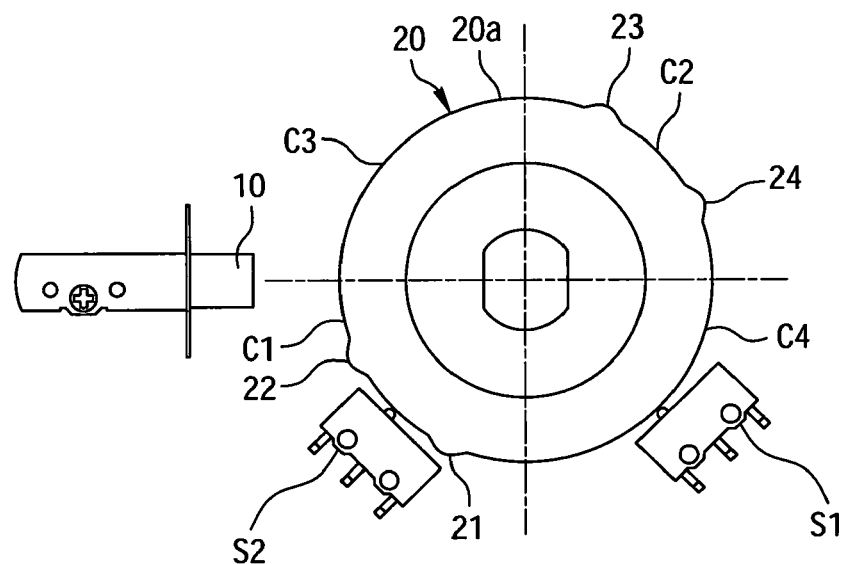
Figure 4E:
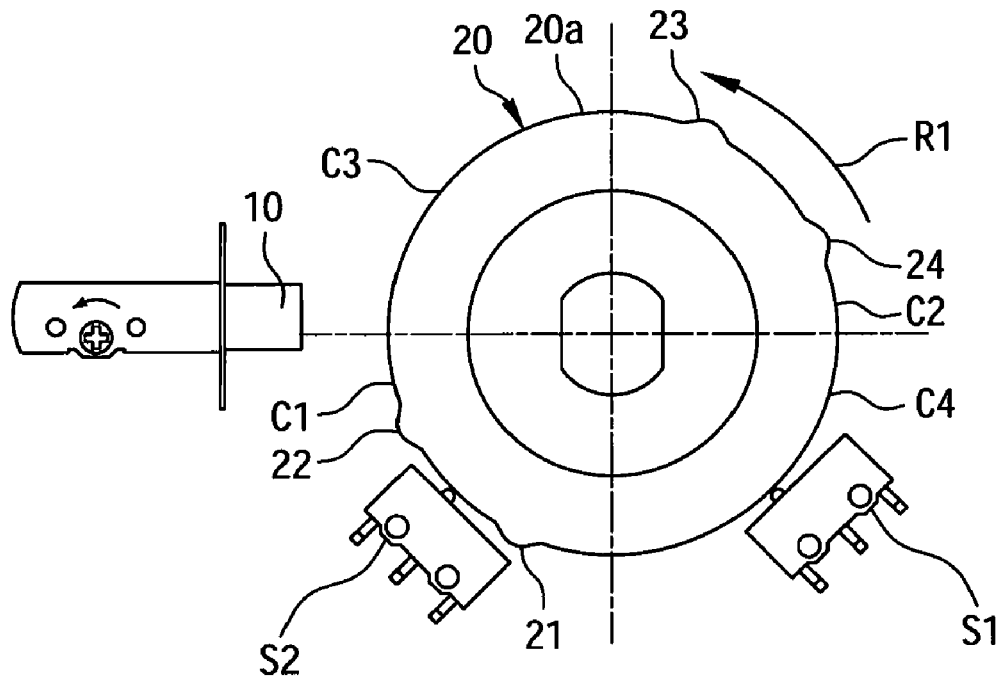
Figure 4F:
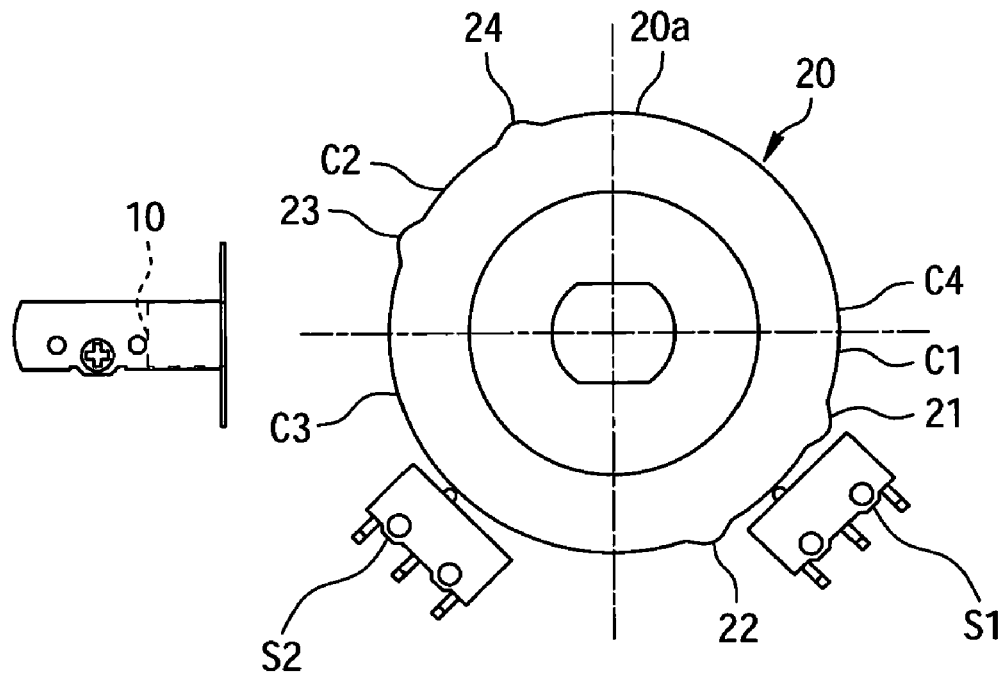

Referring to step (b) in FIG. 1 and FIGS. 3A, 3B, 4A as well as 4B, in this step, the rotational actuator 20 is driven to rotate toward the first direction R1 and meantime touches the first switch unit S1 and the second switch unit S2. It is to be determined which of the switch units is prior touched by the rotational actuator 20. Referring to FIGS. 3A and 3B, if the second protrusion 22 of the rotational actuator 20 touches the first switch unit 51 prior to the second switch unit S2, thereby confirming the electronic lock is installed on the left-handed door. Besides, the latch 10 is also able to be determined that initially installed in a retracted position while the electronic lock installed on the left-handed door is confirmed and now stretches leftward to a locked position. Referring to FIGS. 3C and 3D, after the electronic lock installed on the left-handed door is confirmed, the method further comprises a latch-restoring step of driving the rotational actuator 20 to rotate toward the second direction R2 to successively touch the second switch unit S2 and the first switch unit S1, wherein the third protrusion 23 of the rotational actuator 20 touches the second switch unit S2, and then the second protrusion 22 of the rotational actuator 20 touches the first switch unit S1, so that the latch 10 is retracted rightward to return an unlocked position. Referring to FIGS. 4A and 4B, otherwise, if the second protrusion 22 of the rotational actuator 20 touches the second switch unit S2 prior to the first switch unit S1, thereby confirming the electronic lock is installed on the right-handed door. Besides, the latch 10 is also able to be determined that initially installed in a stretched position while the electronic lock installed on the right-handed door is confirmed and now retracts leftward to the unlocked position. Referring to FIGS. 4C, 4D, 4E and 4F, especially to FIGS. 4C and 4D, after the electronic lock installed on the right-handed door is confirmed, the method further comprises a latch-restoring step including two operations. First operation is driving the rotational actuator 20 to rotate toward the second direction R2 to successively touch the first switch unit S1 and the second switch unit S2, wherein the first protrusion 21 of the rotational actuator 20 touches the first switch unit S1, and then the second protrusion 22 of the rotational actuator 20 touches the second switch unit S2, so as to make the latch 10 stretch rightward to the locked position. Afterward, referring to FIGS. 4E and 4F, second operation of the latch-restoring step is driving the rotational actuator 20 to rotate toward the first direction R1 to successively touch the second switch unit S2 and the first switch unit S1, wherein the second protrusion 22 of the rotational actuator 20 touches the second switch unit S2, and then the first protrusion 21 of the rotational actuator 20 touches the first switch unit S1, so that the latch 10 is retracted leftward back to the unlocked position.

Figure 5A:
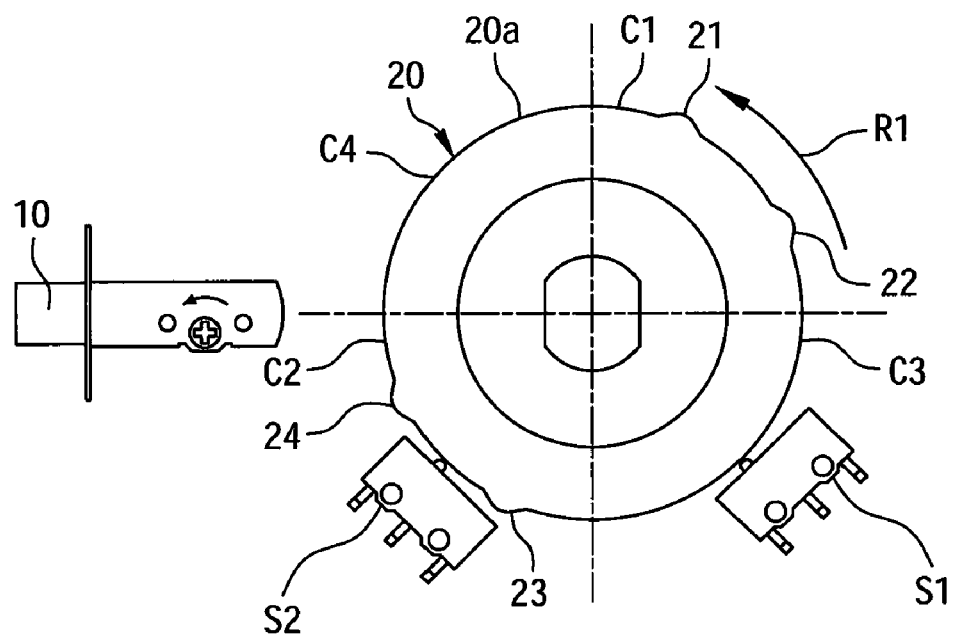
FIGS. 5A to 5D are schematic drawings showing how to confirm the electronic lock installed on the left-handed door in step (c)
Figure 5B:
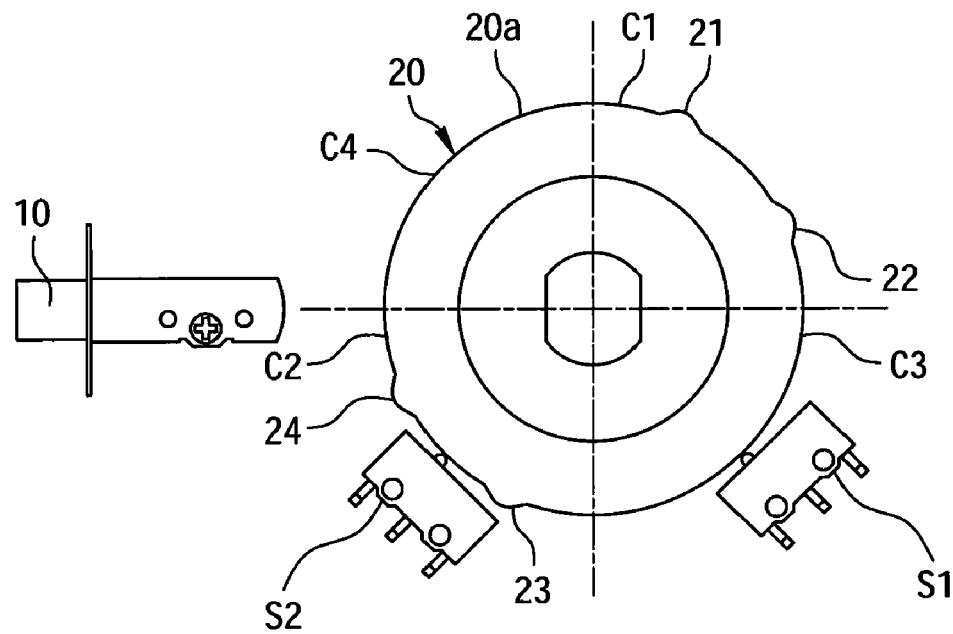
Figure 5C:
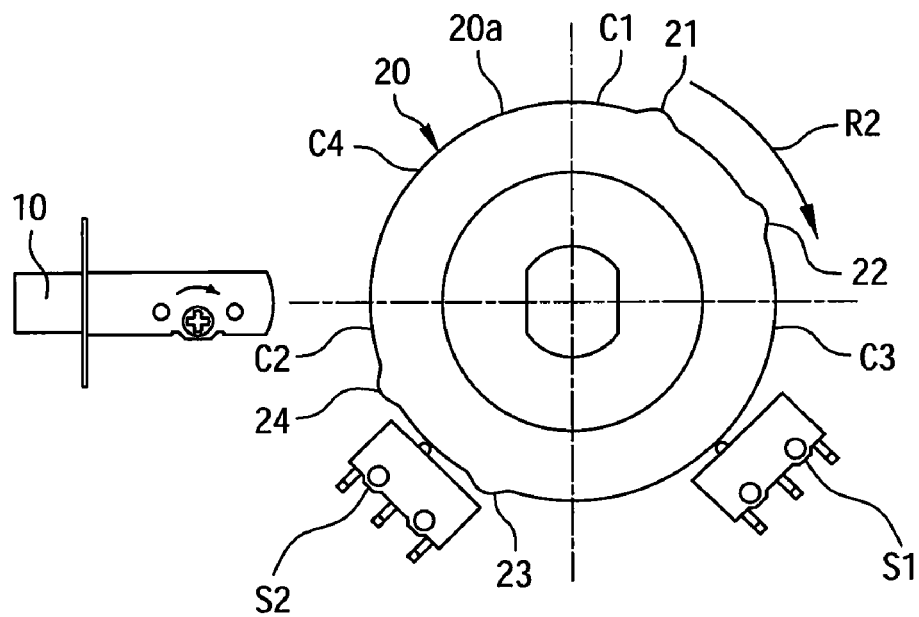
Figure 5D:
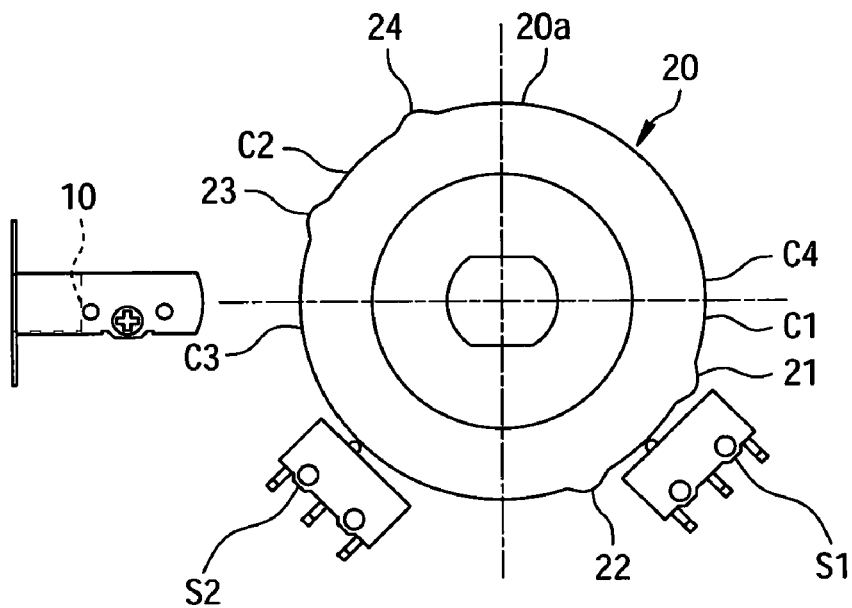
Figure 6A:
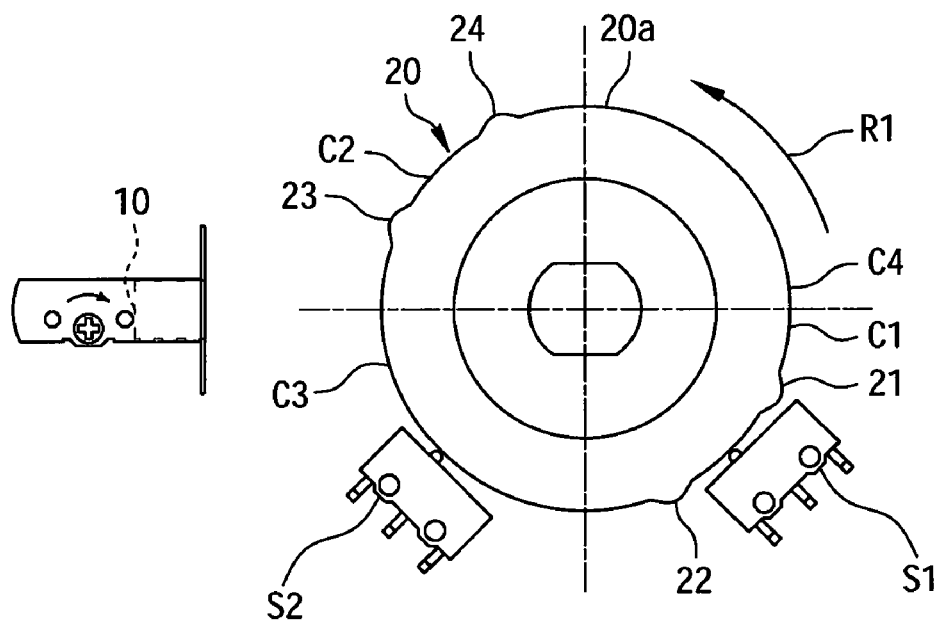
FIGS. 6A to 6F are schematic drawings showing how to confirm the electronic lock installed on the right-handed door in step (c).
Figure 6B:
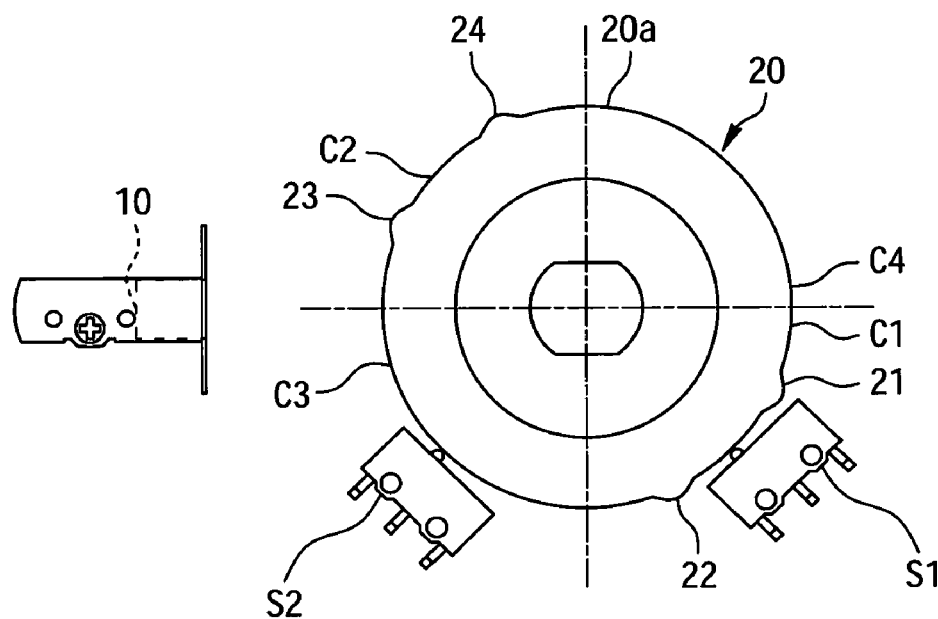
Figure 6C:
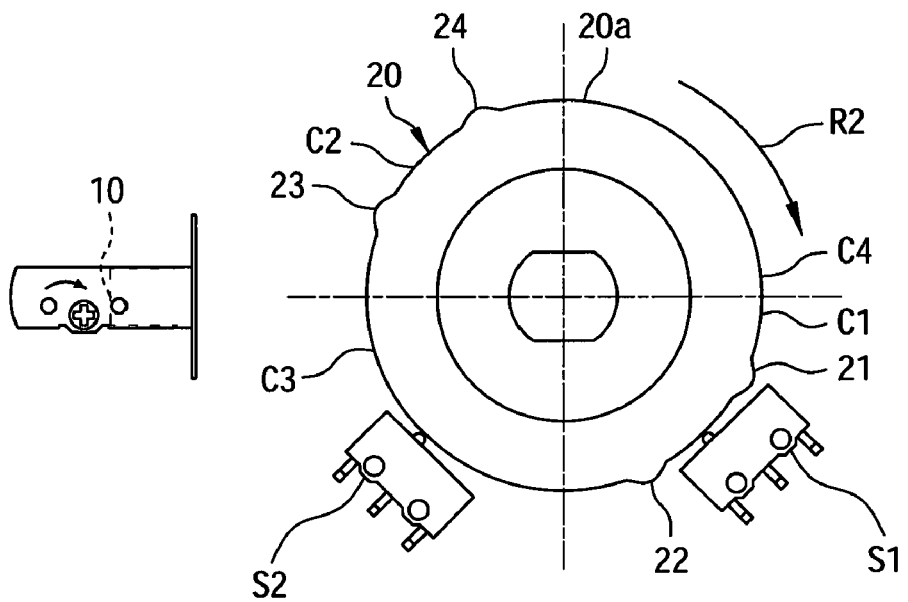
Figure 6D:
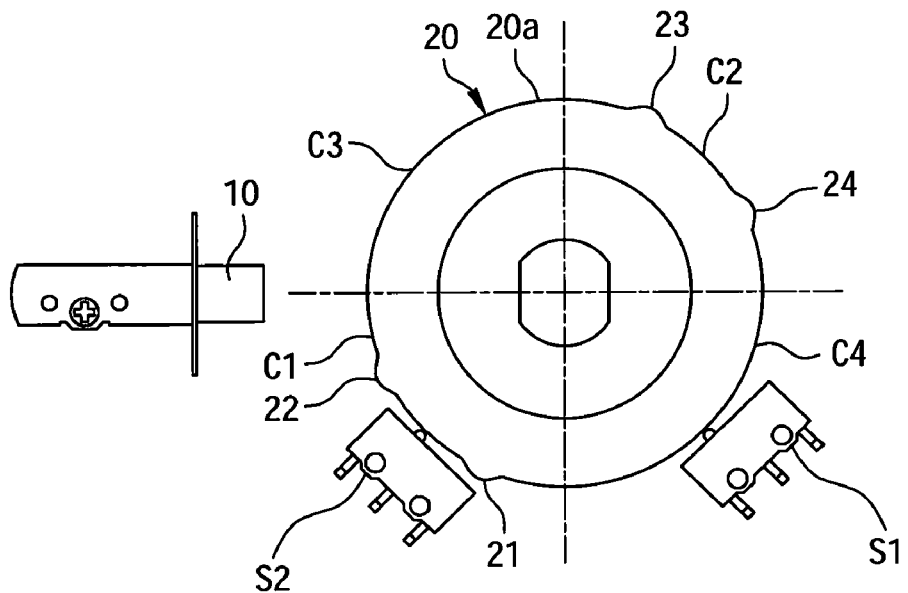
Figure 6E:
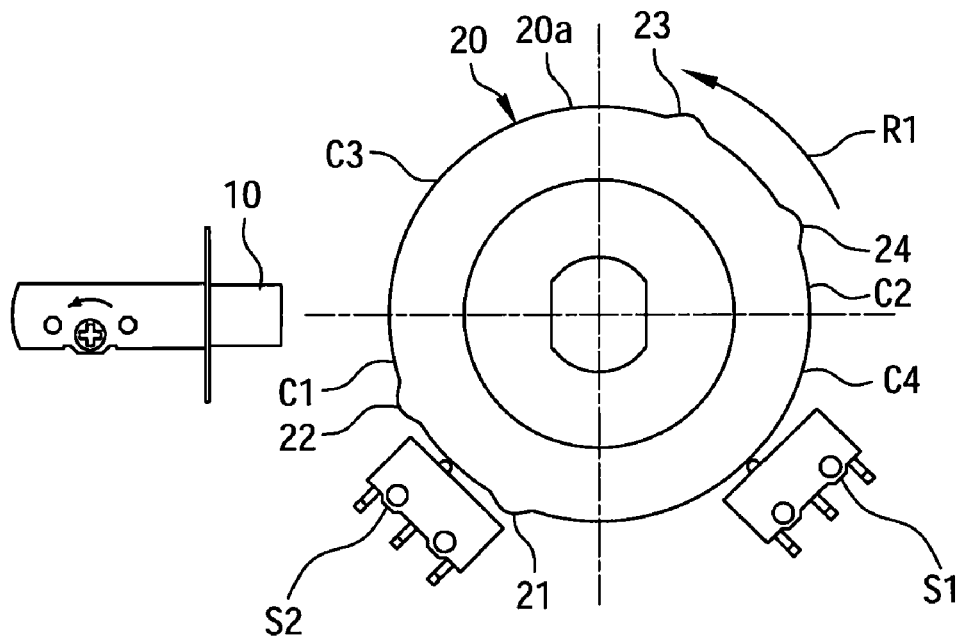
Figure 6F:
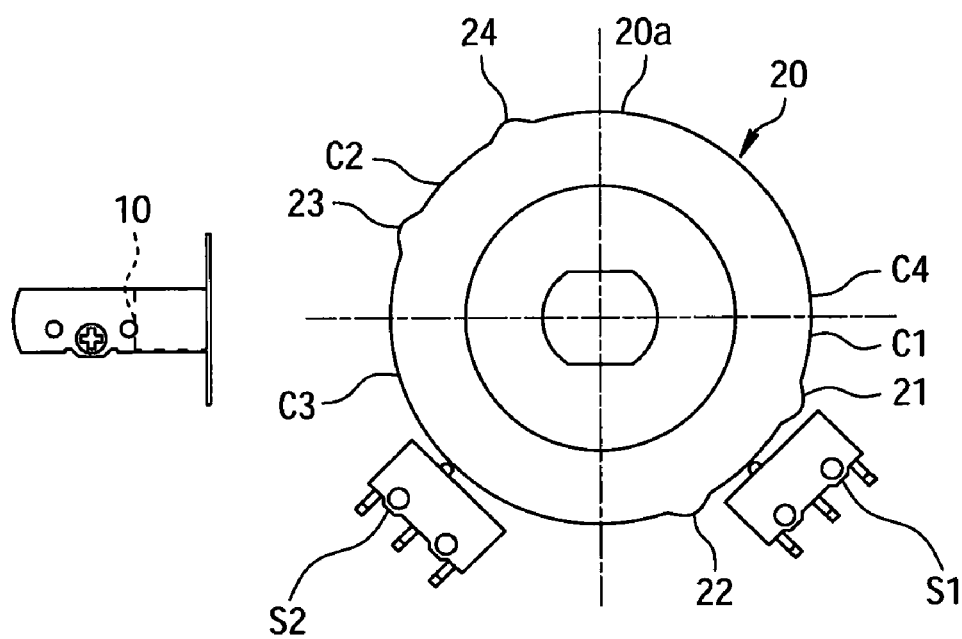

Please refer to step (c) in FIG. 1 and FIGS. 5B, 5C, 6B, as well as 6C, in this step, the rotational actuator 20 is driven to rotate toward the second direction R2 and meantime touches the first switch unit S1 and the second switch unit S2. It is to be determined which of the switch units is prior touched by the rotational actuator 20. Referring to FIGS. 5C and 5D, if the rotational actuator 20 touches the second switch unit S2 prior to the first switch unit S1, thereby confirming the electronic lock is installed on the left-handed door. Besides, the latch 10 is also able to be determined that initially installed in a stretched position while the electronic lock installed on the left-handed door is confirmed. In the present embodiment, the third protrusion 23 of the rotational actuator 20 touches the second switch unit S2, and then the second protrusion 22 of the rotational actuator 20 touches the first switch unit S1, so as to make the latch 10 return rightward to the unlocked position. Referring to FIGS. 6C and 6D, otherwise, if the rotational actuator 20 touches the first switch unit S1 prior to the second switch unit S2, thereby confirming the electronic lock is installed on the right-handed door. Besides, the latch 10 is also able to be determined that initially installed in a retracted position while the electronic lock installed on the right-handed door is confirmed. In the present embodiment, the first protrusion 21 of the rotational actuator 20 touches the first switch unit S1, and then the second protrusion 22 of the rotational actuator 20 touches the second switch unit S2, so as to make the latch 10 stretches rightward to the locked position. Referring to FIGS. 6E and 6F, after the electronic lock installed on the right-handed door is confirmed, the method further comprises a latch-restoring step of driving the rotational actuator 20 to rotate toward the first direction R1 to successively touch the second switch unit S2 and the first switch unit S1, wherein the second protrusion 22 of the rotational actuator 20 touches the second switch unit S2, and then the first protrusion 21 of the rotational actuator 20 touches the first switch unit S1, so as to make the latch 10 move leftward to the unlocked position.

The present invention achieves automatic determination of the electronic lock installed on the left-handed or right-handed door by controlling the rotational directions of the rotational actuator 20 and determining the touching sequence of the first and second switch units S1, S2, so as to enable the electronic lock to be adapted to both the left-handed door and right-handed door, thereby significantly broadening the application scope and convenience of the electronic lock.

While the present invention has been particularly illustrated and described in detail with respect to the preferred embodiments thereof, it will be clearly understood by those skilled in the art that various changed in form and details may be made without departing from the spirit and scope of the present invention.

What is claimed is:

1. A method for automatically determining the direction installation of an electronic lock having a latch, a rotational actuator capable of driving the latch, a first switch unit and a second switch unit comprising the steps of:
   (a) driving the rotational actuator, which is rotatable in two directions, to rotate toward a first direction and verifying whether the rotational actuator is capable of being rotated, if yes, then proceed to step (b), if not, proceed to step (c);
   (b) driving the rotational actuator to touch the switch units during the rotation in the first direction and then proceed to step (d);
   (c) driving the rotational actuator to touch the switch units during the rotation in a second direction and then proceed to step (d);
   (d) verifying which of the switch units is touched first by the rotational actuator to determine the direction installation of the electronic lock; and
   (e) confirming the electronic lock is installed on the left-handed or right-handed door.

2. The method as claimed in claim 1, wherein the rotational actuator has a peripheral surface being composed of a first curved surface, a second curved surface opposite to the first curved surface, a third curved surface located between the first curved surface and the second curved surface and a fourth curved surface opposite to the third curved surface, a first protrusion and a second protrusion, the first protrusion and the second protrusion are formed on the first curved surface.

3. The method as claimed in claim 2, wherein in step (b), the first protrusion of the rotational actuator touches the first switch unit, and the second protrusion of the rotational actuator touches the second switch unit.

4. The method as claimed in claim 2, wherein the rotational actuator further has a third protrusion formed on the second curved surface.

5. The method as claimed in claim 4, wherein in step (b), the second protrusion of the rotational actuator touches the first switch unit, and the third protrusion of the rotational actuator touches the second switch unit.

* * * * *